Nov. 15, 1955   A. M. ALEXANDRESCU   2,723,736
AUTOMATIC FLUID TRANSMISSION WITH SAFETY DRIVING CLUTCHES
Filed Oct. 19, 1950   8 Sheets-Sheet 5
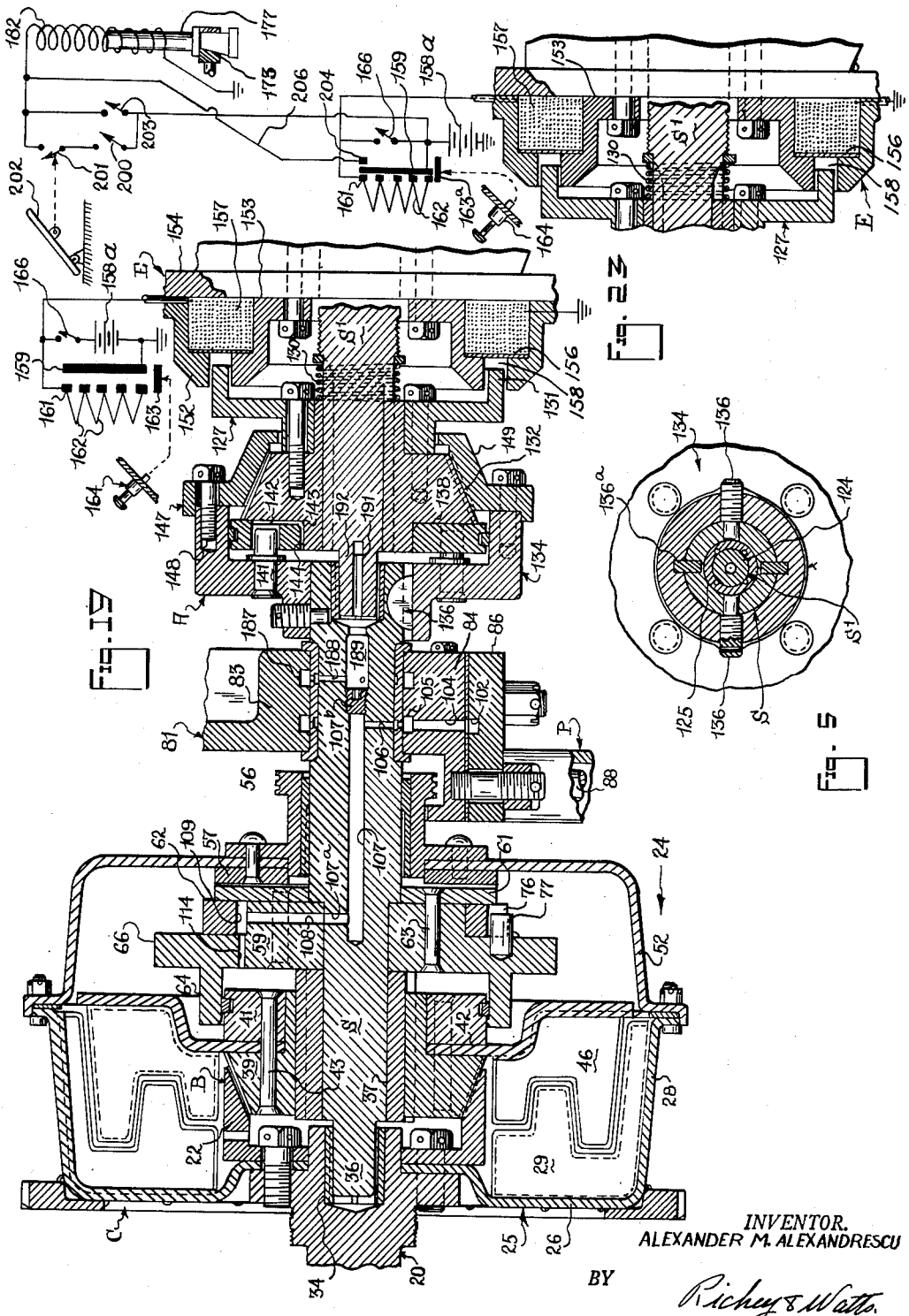
INVENTOR.
ALEXANDER M. ALEXANDRESCU
BY
ATTORNEYS

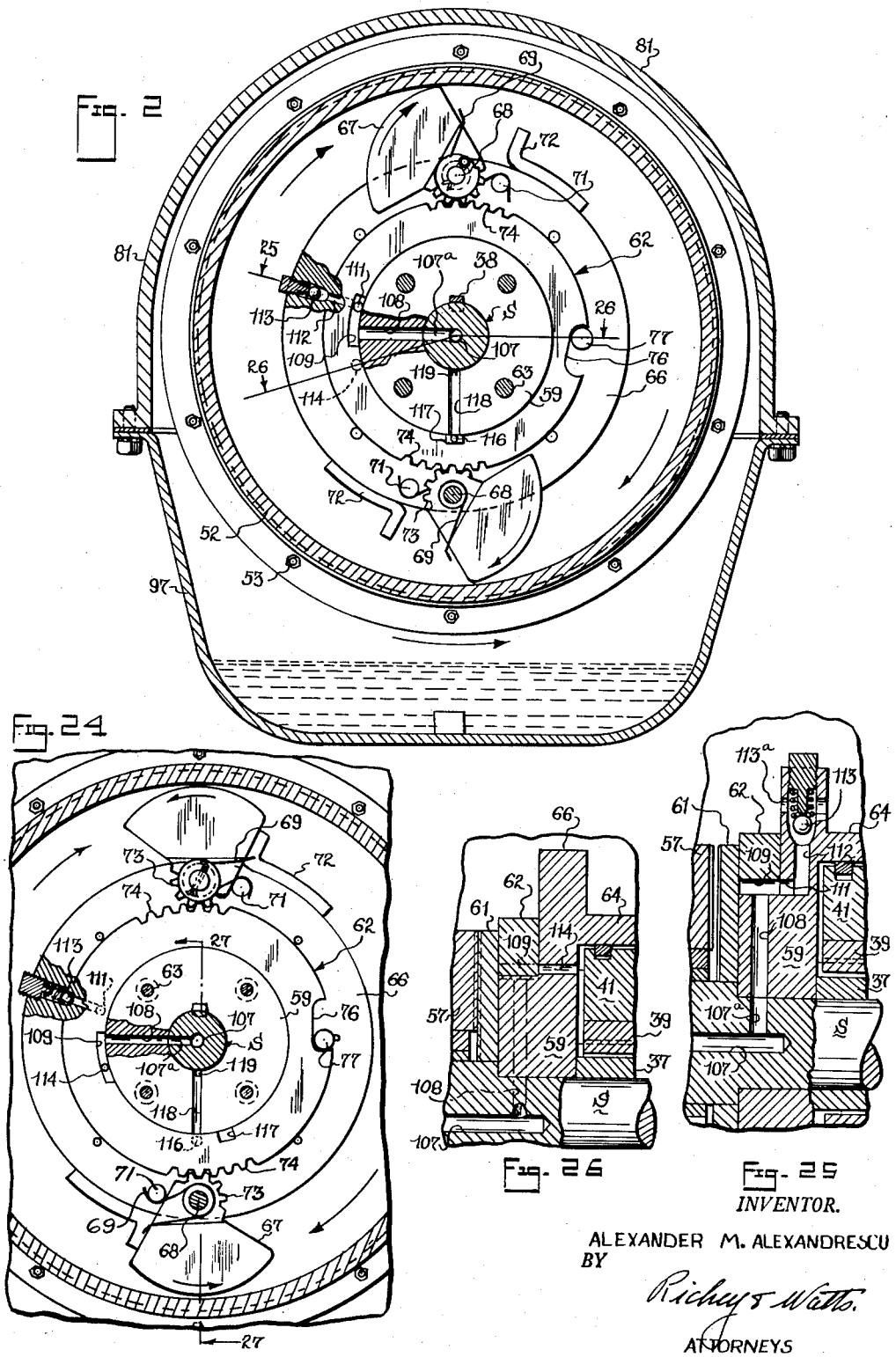

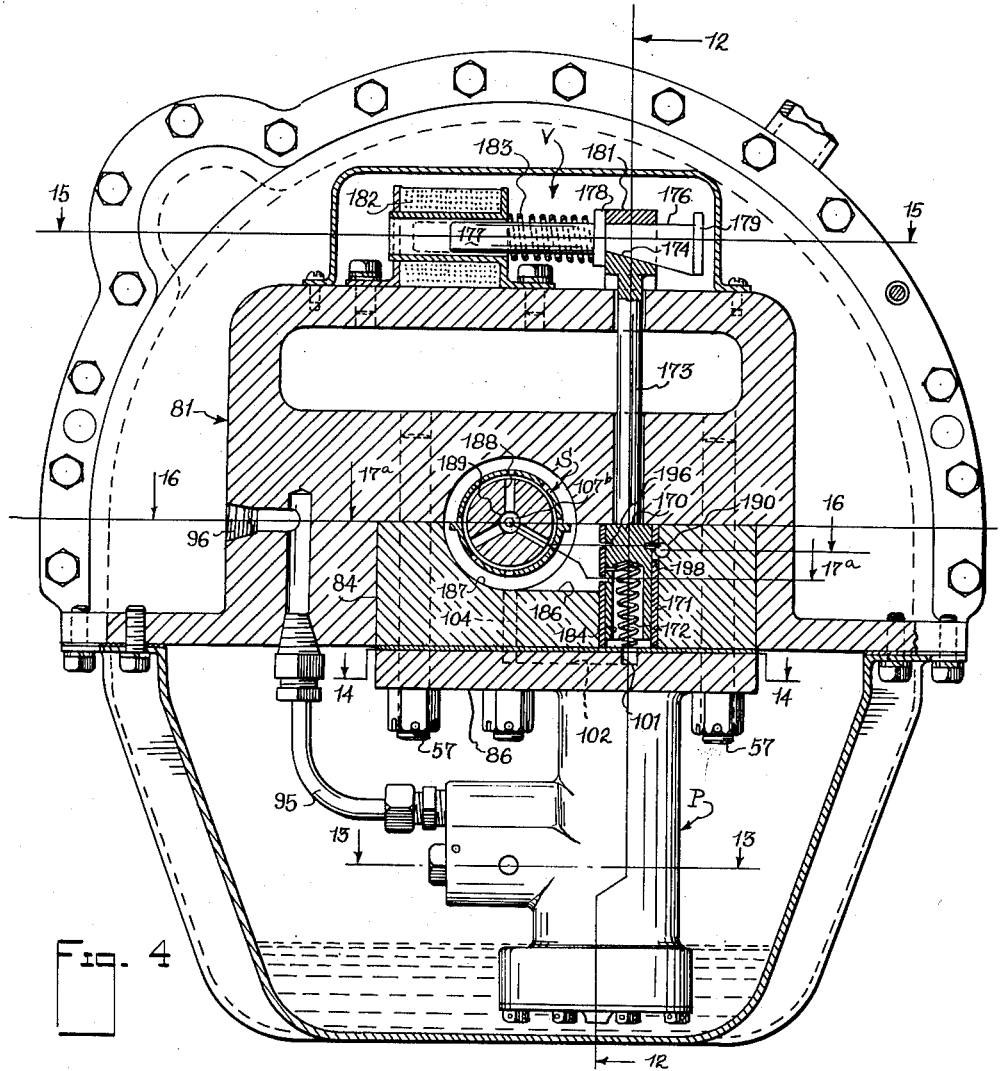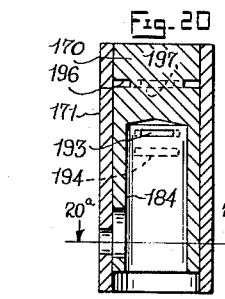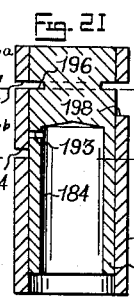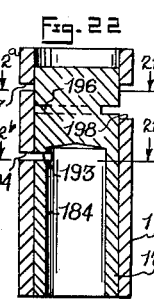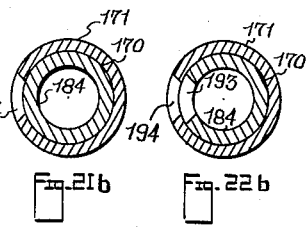

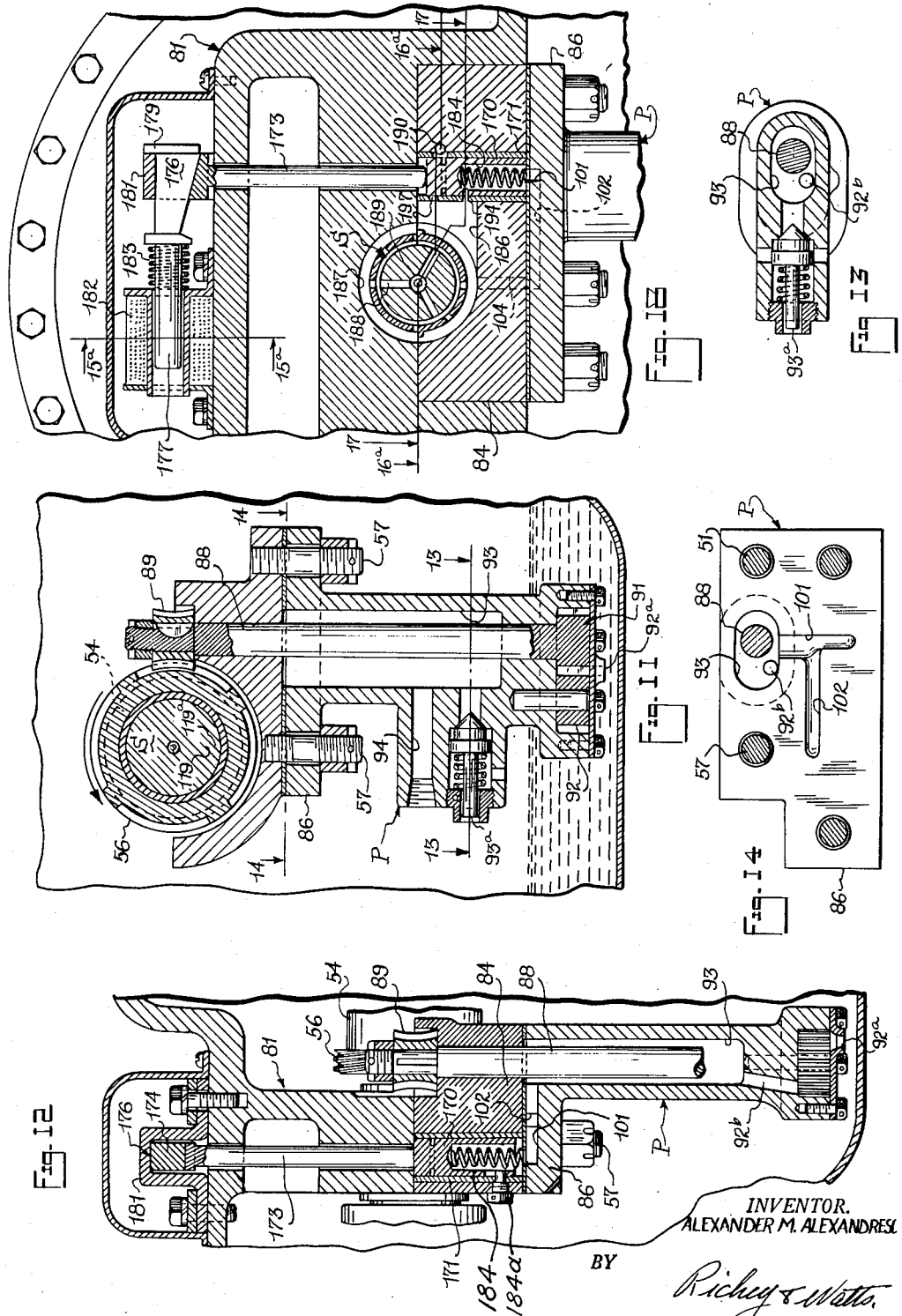

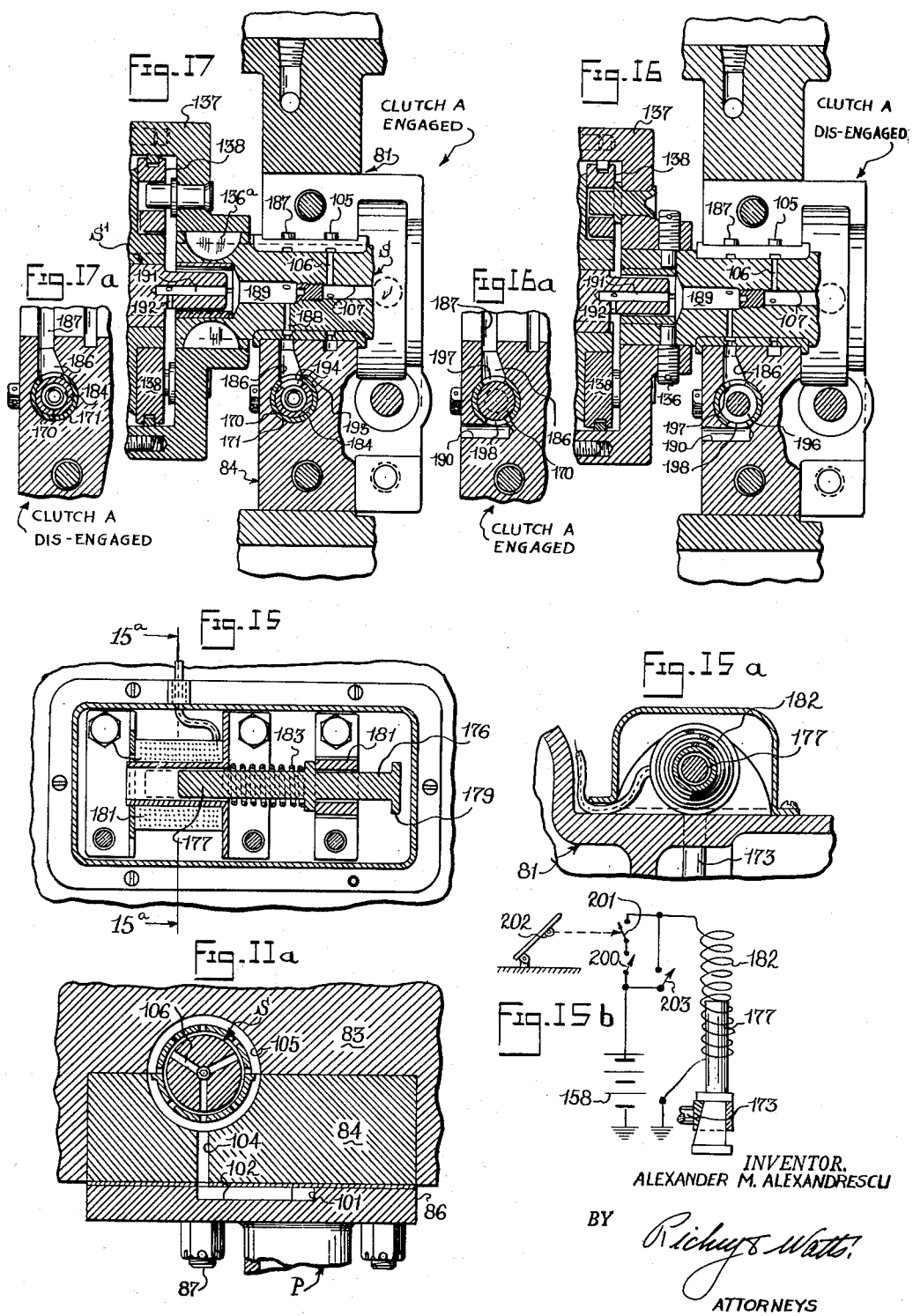

United States Patent Office 2,723,736
Patented Nov. 15, 1955

2,723,736

AUTOMATIC FLUID TRANSMISSION WITH SAFETY DRIVING CLUTCHES

Alexander M. Alexandrescu, Cleveland, Ohio

Application October 19, 1950, Serial No. 190,992

6 Claims. (Cl. 192—12)

This invention relates to automatic transmissions, and more particularly, to such transmissions which involve fluid couplings and clutches. The transmission of this invention may be used with or without an auxiliary gear box, although, as is well known in the art, such a gear box is required if a reverse drive is to be provided.

A principal object of the invention resides in improving the smoothness of the accelerating action of the transmission, and improving the efficiency of the transmission by providing for direct drive after initial acceleration is attained.

Another object resides in eliminating "creep" from fluid drive transmissions and rendering vehicles safe for repairs or other operations thereof other than driving.

Still another object resides in provision of automatic free wheeling, if desired, without the use of ratchets or over-running clutches.

Another object resides in facilitating using the vehicle engine as a brake independently whether the engine is running or not.

Still another object resides in providing safety means for engaging the main drive clutch so that the engine may be used as a brake, whether or not certain normally-operating components in the transmission are functioning. It will also provide for the independent braking of the rear wheels both with and without the use of an engine as a brake at the complete selection of the operator.

In the preferred and complete embodiment of the invention, these objects are accomplished by providing a drive through a fluid coupling for use in acceleration and a clutch that is automatically engaged in normal operation when the accelerator is depressed to start the vehicle. In addition to this main or driving clutch there is a direct drive clutch provided in a connection with the fluid coupling which is speed responsive and which provides for direct drive independent of the fluid coupling, when the driving clutch is engaged.

It is a feature of the invention that although the pump which supplies fluid under pressure for operation of the fluid coupling and its associated direct drive clutch is driven by the engine side of the fluid coupling impeller, it is still operable when the vehicle is coasting and the rear wheels are driving the transmission shafts. This facilitates using the engine as a brake either through the coupling or the direct drive clutch.

Auxiliary and safety braking is obtained by a magnetic brake which operates on the drive to the rear wheels, such safety brake being formed so that when its coils are fully energized control of the main clutch that is normally provided by stepping on the accelerator is taken over by the magnetic clutch, whether or not the accelerator control mechanism for the main clutch is functioning.

The manner in which these and other objects of the invention are accomplished will be apparent from the following detailed description of the preferred embodiment of the invention.

In the drawings:

Fig. 2 is a transverse section taken on 2—2 of Fig. 1;

Fig. 4 is a section taken on 4—4 of Fig. 1 showing the arrangement for the accelerator-controlled valve for the main clutch;

Figs. 5 to 10 are fragmentary sections taken on corresponding lines of Fig. 1 illustrating various details of the shaft and hub arrangements of the transmission;

Fig. 11 is a section taken on 11—11 of Fig. 1 showing details of the pump drive;

Figure 1:
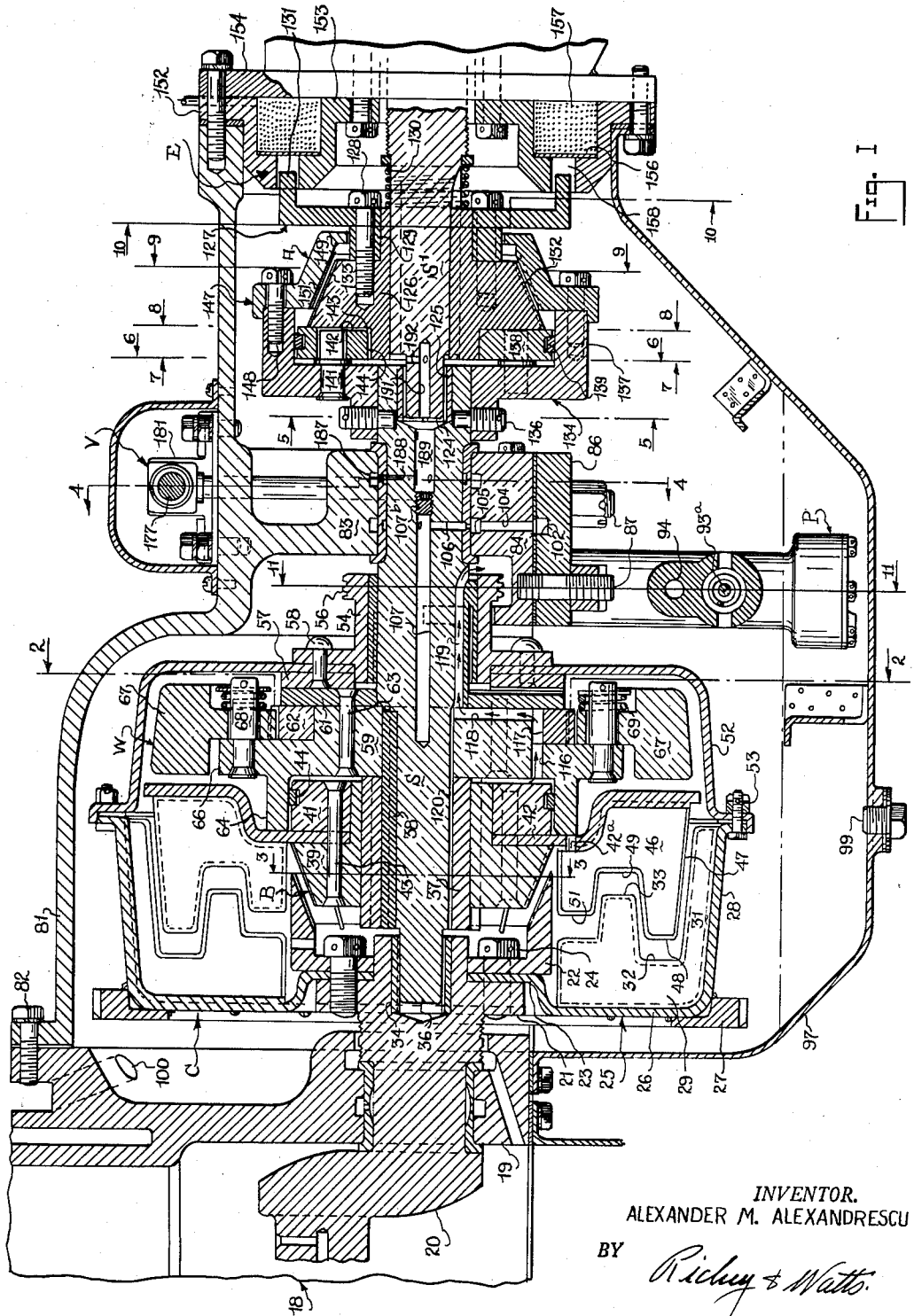
Fig. 1 is a longitudinal section through the transmission with all clutches and the magnetic brake disengaged.
Figure 27:
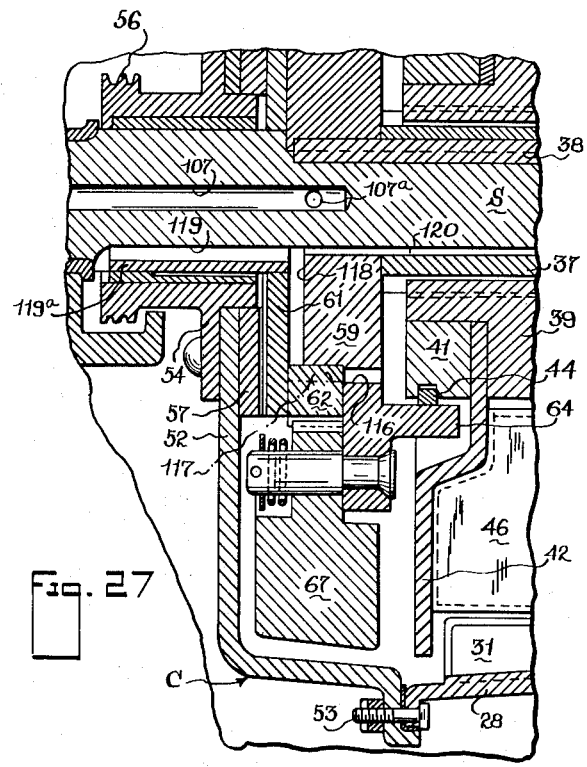

Fig. 11a is a partial section taken through the groove 102, bore 104 and apertures 106;

Fig. 12 is a section taken on 12—12 of Fig. 4, details of the pump as well as the accelerator-controlled valve for the main drive clutch;

Fig. 13 is a fragmentary section through the pump taken on 13—13 of Fig. 11;

Fig. 14 is a fragmentary section showing the pump mounting block and fluid passageway grooves taken on 14—14 of Fig. 11;

Fig. 15 is a section through the solenoid controlling the clutch valve taken on 15—15 of Fig. 4;

Fig. 15a is a section taken on 15a—15a of Fig. 15;

Fig. 15b is a diagrammatic illustration of the wiring of the clutch-control solenoid;

Fig. 16 is a fragmentary section taken on 16—16 of Fig. 4 showing one set of valve ports with the main clutch control valve in its disengaged position;

Fig. 16a is a partial section of the same parts as indicated on Fig. 18 except that the valve is in the clutch-engaged position;

Fig. 17 is a section taken on 17—17 of Fig. 18 showing the lower set of valve ports with the clutch in its engaged position;

Fig. 17a is a similar section taken on 17a—17a of Fig. 4 showing the lower ports with the clutch in its disengaged position;

Fig. 18 is a view like Fig. 4 except that the clutch-control valve is moved to its engaged position;

Fig. 19 is a partial section similar to Fig. 1 with all clutches engaged. Some of the parts in this figure have been rotated from the position shown in Fig. 1 so that different ports appear in the figure;

Figs. 20 to 22 and their sub-figures are enlarged views of the control valve and its associated sleeve to more clearly illustrate the various ports therein;

Fig. 23 shows wiring connections for the clutch-control valve and the electric brake whereby the clutch-control valve may be actuated from the pedal that normally controls the electric brake;

Fig. 24 is a view similar to Fig. 2 except that the piston is extended in its cylinder to engage the direct-drive clutch;

Fig. 25 is a section taken on 25—25 of Fig. 2 showing the hydraulic valve for the direct-drive clutch in the position wherein the clutch is disengaged;

Fig. 26 is a section taken on 26—26 of Fig. 2; and,

Fig. 27 is a section taken on 27—27 of Fig. 24 which shows the connections that cause the direct-drive clutch to drain passages to be blocked, as they are when the clutch is in its drive position.

Referring to Fig. 1, the basic units of the transmission comprise a main clutch A, an electric brake E, a main clutch-control valve assembly V, a direct drive clutch B, a coupling C, speed responsive control means W, and a pump P. The internal combustion engine 18 has a rear main bearing 19 and is fitted with the usual crankshaft 20 which is flanged as at 21 for connection as a driving or input shaft to the coupling C and the direct drive clutch B. Flange 21 mounts a clutch member 22, and a hub 23 of the impeller by means of a plurality of cap screws 24. Member 23 is the hub of a sheet metal cup member 25 that forms part of the impeller assembly and has a radial flange 26 to which a ring gear 27 may be attached for meshing with the pinion of a starting motor (not shown).

The impeller member 25 has a peripheral flange 28 and joined to walls 26 and 28 are the impeller blades or vanes 29. Such blades each have a peripheral portion 31, a deep notch as at 32, and inner tongues as at 33, and the blades may be cupped or flanged as explained in my copending application, Serial No. 122,236, filed October 19, 1949, now abandoned.

Figure 3:
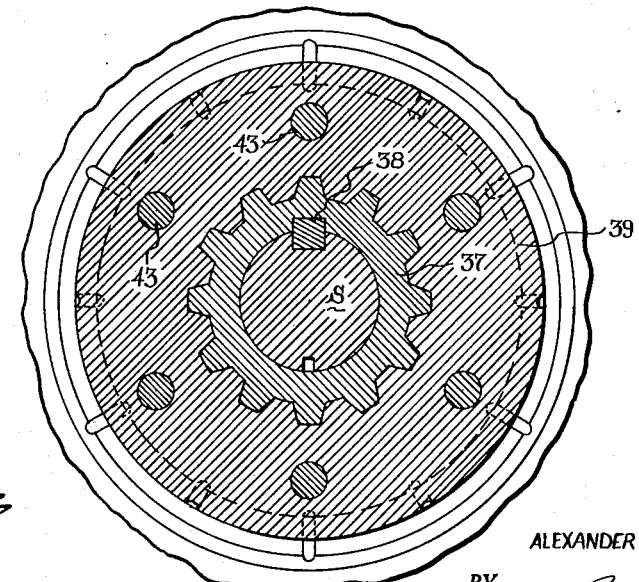
Fig. 3 is a fragmentary section taken on 3—3 of Fig. 1, the direct drive clutch hub arrangement.

The crankshaft is socketed and has a pilot bearing 34 for reception of the pilot nose 36 extending integrally from an intermediate driven shaft S. Mounted on shaft S is a splined sleeve 37, nonrotatably coupled with the shaft by means of a key 38. The sleeve and key may be most clearly seen in Fig. 3 of the drawings, but they also appear in Fig. 1.

A runner or rotor assembly is slidably mounted on the splines of sleeve 37. This latter assembly includes a hub member 39 which also serves as a conical clutch member for engaging the clutch part 22 on the crankshaft, and a ring member 41 is provided which clamps the hub portion of a sheet metal flange 42 to the hub 39 by means of rivets 43 so that hub 39, ring 41, and flange 42 are, in effect, one piece. Ring 41 is grooved to mount a piston ring 44. Flange 42 may be apertured as at 42a to permit circulation of fluid within the fluid coupling. Flange 42 has mounted thereon a plurality of runner vanes 46, each of which has a peripheral portion 47 disposed closely within portion 31 of the impeller vanes 39, a tongue 48 complementary to notch 32 in the impeller blades, a notch 49 complementary to tongues 33 in the impeller blades, and a tongue 51 extending within tongue 33 on the impeller blades.

The impeller forms with the shaft S an inner fluid housing as well as a housing for the clutch B and clutch-operating mechanism W. To complete the housing, a cup-shaped member 52 is bolted to the section 25 of the impeller by suitable cap screws 53. An outboard sleeve member 54, which mounts a worm 56 for driving the pump, is riveted to the hub of impeller casing part 52 as well as to a clutch ring 57 by means of suitable rivets 58.

Mechanism for advancing the runner blades toward the impeller blades is incorporated within the housing formed by the impeller. To this end a hub 59 is keyed to shaft S by the same key 38 that keys the splined sleeve 37 thereto, which hub is riveted to a clutch ring 61 formed for engaging the clutch ring 57 on the impeller. This assembly mounts an annular valve ring 62 which is permanently retained between clutch ring 61 and hub 59 by means of the rivets 63. The valve ring 62 appears in plan in Figs. 2 and 24. Both sets of opposed clutch members, such as 57 and 61, are made of different materials, one member being of steel for example, and the other member of brass or bronze. The members are slotted for lubrication during slipping of the clutch.

Hub 59 has an axially-extending flange portion 64 which serves as a cylinder in cooperation with the piston and piston ring 41 and 44 of the movable runner assembly. Hub 59 has a peripheral flange 66 which pivotally mounts a plurality of centrifugally-operated actuating weights 67 by means of pins 68 attached to flange 66. As best seen in Figs. 2 and 24, weights 67 are urged toward their innermost position (Fig. 2) by means of spring 69 coiled about pins 68 and engaging the weights 67 at one end and spring posts 71 mounted on flange 66 at the other end. Stops 72 are provided for limiting the outward motion of the weights which are engaged by said weights as seen in Fig. 24. Each weight has a toothed sector 73 which cooperates with teeth 74 formed on the periphery of the valve ring 62. The valve ring is notched as at 76 (see Figs. 2 and 24) to provide abutment or stop shoulders for respectively engaging a pin 77 fixed to flange 66 of the runner hub member.

A main or outer housing 81 for the mechanism just described bolts to the engine block by means of bolts 82 (see Fig. 1) and has an intermediate bearing 83 for the shaft S. A bearing cap 84 and a flange 86 of a pump P are bolted to the housing 81 by means of studs and nuts 87. The nature of the pump P is not critical to the invention, the type of pump illustrated in the preferred embodiment being also disclosed in my copending application, Serial No. 174,100, filed July 15, 1950, now abandoned.

Referring to Figs. 11 to 14, the pump is operated by a drive shaft 88 to which is keyed a worm gear 89 meshing with the worm 56. The pump is of the spur-gear type and includes driving and driven gears 91 and 92 mounted in a casing with the usual inlet 92a in the bottom of the casing and an outlet bore 92b leading up to a chamber 93 surrounding shaft 88. A relief valve 93a is incorporated in the pump body for limiting the pressure that may develop and thereby avoiding overload of the parts. This relief valve, for example, may be set to relieve pressure in excess of 40 p. s. i. which, for example, is approximately 10 p. s. i. higher than the maximum pump pressure delivered within the impeller housing I. The pump also supplies, by means of bore 94 and conduit 95, fluid under pressure to a bore 96 formed in the housing 81 arranged for connection to an automatic gear box or transmission device which forms no part of this invention and is not shown.

The entire assembly thus far described has its lower portion enclosed by an oil pan 97 provided with a drain plug 99. Filling port 100 (seen in Fig. 1) is formed in the engine block for filling the unit with hydraulic liquid such as oil or the like.

Having described the mechanical arrangement of the parts, pump P, coupling C, clutch B, and centrifugal control W, the arrangement of fluid passageways to this section of the transmission will next be explained. As seen in Fig. 14, pump chamber 93 has extending therefrom a groove 101 and an intersecting groove 102 is formed in pump flange 86. As seen in Fig. 19, and other figures, the bearing cap 84 has a vertical bore 104 extending from groove 102 and connecting to an annular groove 105 surrounding the intermediate shaft bearing. The bearing is apertured and the shaft S drilled radially several times as at 106 to conduct fluid under pressure delivered from the pump to an axial bore 107 formed in the shaft. Bore 107 leads to a radial bore 107a formed in the shaft which, in turn, communicates with a bore 108 in hub 59 of the runner assembly. Bore 107 is plugged as at 107b by a screw plug. The ring valve 62 is notched as at 109 (see Figs. 2 and 24 for example) to provide means for selectively establishing communication between the pump and either the interior of the housing of the impeller or the cylinder and the piston arrangement represented by parts 64 and 41.

The ring valve 62 and various fluid ports and passages are disposed so that when the weights 67 are in their innermost position (representing the condition wherein the shaft S is stationary or revolving slowly), notch 109 in the ring valve 62 is in communication (as best seen in Figs. 2 and 11) with a pair of ports 111 and passageway 112 formed in hub 59, which directs fluid to a check valve 113 and out port 113a formed in flange 66 of hub 59 so that such fluid may fill the interior of the impeller housing and serve as a driving medium between the vanes of the impeller and the runner. The check valve 113 prevents evacuation of the impeller housing under pressure generated by the driving force between the blades of the two coupling members.

If the ring valve is in its other position, that is the position shown in Figs. 19 and 24, the weights 67 (Fig. 24) are in their outermost position, which occurs when the shaft S is rotated at a predetermined speed, representing a vehicle speed of 10 or 15 M. P. H., in a typical installation. Under these conditions fluid under pressure from the pump is directed to a port 114 in the hub 59 which is in line with the notch 109 in the ring valve 62. With valve 62 in this position (as seen in Figs. 19 and 24), such fluid may enter the piston and cylinder chamber formed by elements 64 and 41 to urge the runner and its clutch element toward the impeller and its clutch element (to the left in Fig. 19) so that the coupling vanes or blades approach one another.

In addition to the aforesaid passageways for conducting fluid under pressure from the pump, means are provided for exhausting fluid from the chamber formed by the piston 41 and cylinder 64 assembly as well as exhausting air from the impeller housing adjacent the coupling blades. When the shaft is stationary or turning slowly and the ring valve is in the position shown in Fig. 2, it is desired to permit fluid pressure in the impeller housing to force back the runner. To this end a cylinder exhaust port 116 (seen in Figs. 2 and 27) is formed in hub member 59 of the runner which may communicate (Fig. 2) with a notch 117 formed in the ring valve 62. Also, a groove 118 is formed in the hub member 59 and, as seen in Figs. 1, 11 and 27, a passageway 119 is formed in the shaft S enclosed by a strip 119a, which passageway communicates with the radial groove 118 in the hub member 59. Passageway 119 serves as a leakage passage from the cylinder and impeller housing and also lubricates the worm 56.

With the weights retracted (as seen in Fig. 2), which represents little or no rotation of the shaft S, the aforesaid connections open the interior of the chamber formed by the cylinder and piston members 64 and 41 to the interior of the impeller housing, giving a means of egress for fluid from the piston and cylinder chamber, the complete path thereof being clearly seen in Fig. 1. When the ring valve is in its other position due to outward motion of weights, to establish communication between the pump and the cylinder chamber (as shown in Figs. 19 and 24) the exit port 116 from the cylinder is blocked by the ring valve, as shown in Figs. 2 and 27.

The passageway 120 is formed in the splined passageway sleeve member 37 which communicates with the aforesaid passage 119 and permits the evacuation of air from the impeller during the operation thereof because hydraulic fluid, being the heaviest, accumulates around the periphery of the impeller housing and the air which is forced to the center thereof may escape through passage 120 and 119 (as best seen in Fig. 1) and prevent a pneumatic blocking of the impeller housing. Also, due to the driving pressure within the housing, after the latter is filled there is a constant small flow of oil out through passageway 120, which loss is supplied by the pump as the ring valve moves under operating conditions.

The general arrangement of the fluid coupling, ring valve and pump is disclosed and claimed in my copending application, Serial No. 174,100, filed July 15, 1950, now abandoned.

The construction and the connections of the fluid coupling, its associated clutch and speed sensitive control means, including the ring valve therefor, have been explained.

Next the construction and connections of the safety clutch A, the magnetic brake or clutch E, and the control valve V for these parts will be set out. The intermediate shaft S, which extends through the intermediate bearing 83, has at its extremity a socket or bearing for guiding the end of the output shaft $S_1$. In this construction the output shaft $S_1$ has a pilot or nose 124 which runs freely in the bearing 125 formed in the end of the shaft S. On the output shaft $S_1$ is a hub member 126, the splined connection being such that hub member 126 slides for a limited distance along the output shaft $S_1$. Mounted on hub member 126 is an electric brake armature disc 127 fastened by means of bolts 128 which extend through a hub member 129 into member 126. A peripheral flange 131 extends from member 127 for co-action with the electric brake E. A spring 130 urges the hub member to the left in Fig. 1, which is in its disconnect position.

Figure 6:
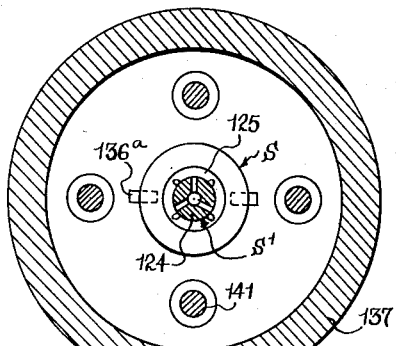
Figure 8:
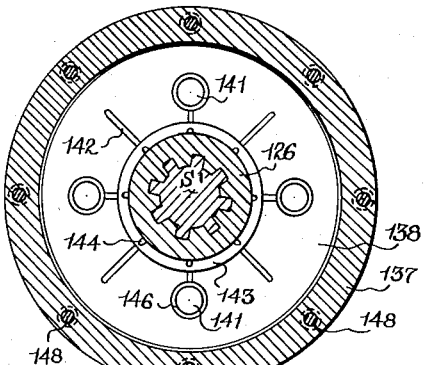
Figure 7:
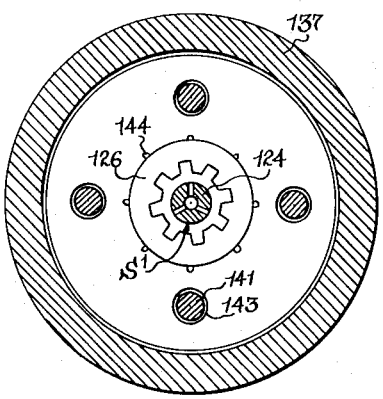
Figure 9:
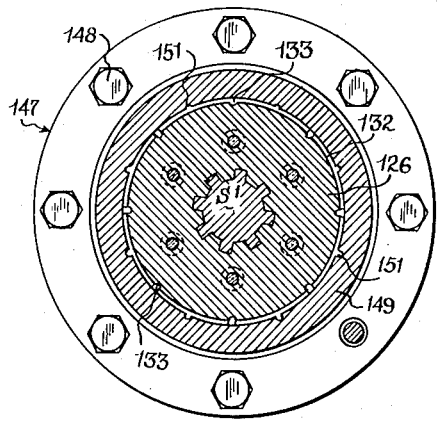
Figure 10:
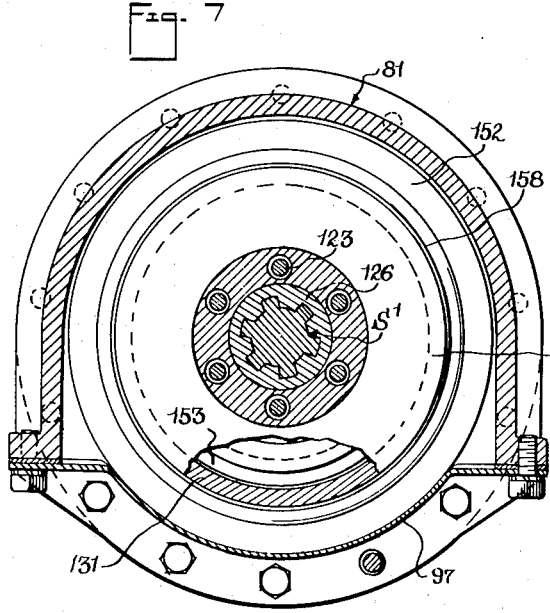

The periphery of member 126 is conical as at 132 forming the clutch surface and it is grooved as at 133 to provide for lubrication and to prevent galling of the parts. The two cooperating clutch parts forming clutch A include member 134 which is held on shaft S by screws 136 (as seen in Figs. 1 to 5) and by keys 136b (as seen in Figs. 5 and 6). The peripheral flange 137 of the hub member 134 serves as a cylinder for receiving the piston 138 which has a suitable piston ring 139. Piston 138 is mounted upon guiding pin 141. It is radially slotted as at 142 (as best seen in Fig. 8) which slots do not extend to the periphery of the piston so that fluid will not entirely leak past the piston. Clearance 143 is provided by a bevel on the piston that connects a series of axial slots 144 and radial slots 142 to supply fluid for lubrication of the rubbing surfaces. Fluid may also pass in a small circumferential clearance about the pins 141.

The second clutch member, indicated generally at 147, is bolted to the hub 134 by means of bolts 148 and has a conical clutch flange 149 complementary to the surface 162 on the splined clutch member. The female or inner surface 149 is likewise grooved as at 151 to provide for lubrication to prevent galling of the parts. In both clutches A and B, one of the inner or outer members is made of different material than the other. For example, one may be made of hardened steel and the other of brass or bronze.

Stationary portions of the magnetic brake E include an outer annulus or pole piece 152, an inner annulus or pole piece 153, and a cover plate 154, all of these being fastened so as to be mounted upon the frame of the units. The pole pieces are made with a cavity for an electric winding, there being a bottom ring of brass 156 between the winding 157 within the cavity to prevent it from being displaced into an annular groove 158 between the pole pieces. Groove 158 receives the annular flange 131 of the magnetic brake disc 127 and subjects it to the magnetic forces between the poles.

One wiring connection to the magnetic clutch E is shown diagrammatically in Fig. 19. One side of the winding 157 of the magnetic brake is grounded as is the battery 158a. The battery is connected to a contact bar 159 and there are provided contacts 161 connected by resistance units 162. These units in turn are connected to the other side of the winding 157. Contactor 163 energizes the winding 157 depending upon its position along the contact bar. Since no clutch pedal need be employed with this transmission, suitable manual or pedal connections, such as 164, may be connected by any linkage to the contact slider 163 to energize to a suitable degree the winding of the magnetic brake E. An emergency switch 166 may be provided on the instrument panel to apply full battery current to the winding 157 if so desired.

The control assembly V for the clutch A and its connections will now be described. Referring to Fig. 4, a plunger-like valve 170 is slidably mounted in a sleeve 171, pressed into a suitable bore in bearing block 84. The valve is spring urged to its uppermost position in Fig. 4 by a spring 172 housed in a counterbore in the valve. The valve is actuated by a plunger 173 carrying a bevelled head 174 that may be depressed by a solenoid assembly. The solenoid assembly includes a wedge-shaped member 176 having an undersurface complementary to that of the head 174, having integrally formed therewith an armature 177 and stops 178 and 179. A strap-like member 181, best seen in Fig. 12 but also appearing in Fig. 4, serves as a guide to prevent upward motion of the solenoid head as well as rotation or twisting motion of the head and of the plunger head 174. A solenoid winding 182 surrounds the armature 177 and is suitably fastened. The parts are arranged so that when the solenoid winding 182 is energized the wedge-shaped head 176 is retracted into the solenoid against the force of a spring 183, which causes the plunger to move down from the position shown in Fig. 4 to the position shown in Fig. 18. This, in turn, depresses the valve against the force of the valve spring 172. As seen in Fig. 12, a screw 184a sliding in a slot in the valve 170 prevents rotation of the valve and assures alignment of the parts thereof with those in the sleeve 171. The fluid connections from the pump to the valve 170 can best be seen in Fig. 12 but also appear in Figs. 4 and 18, it being apparent that the cross groove 101 formed in the pump block 86 communicates with the bore 184 formed in the valve which is the bore that receives the valve spring. The valve is arranged in general so that when it is in its upper position, as seen in Fig. 4, pump pressure is blocked by the valve and the piston and cylinder assembly for the clutch A as connected to exhaust. These connections include the chamber 186 communicating with the shaft S, best seen in Figs. 4 and 18, which chamber communicates with a groove 187 surrounding the shaft bearing, there being radial ports 188 in the shaft which lead to a portion from the bore 189 in the shaft S that is blocked off by the plug screw 107b. Bore 189 also appears in Figs. 1 and 19. Bore 189 in shaft S is in communication with bore 191 in the output shaft $S_1$, which, in turn, communicates with radial bores 192 that lead to the space in the piston that operates clutch A and the cylinder therefor. Thus, when the valve 170 admits fluid to the chamber 186 such fluid is directed to the piston 138 of clutch A causing the clutch to engage.

The port arrangements of valve 170 in sleeve 171 which alternately connect the piston and cylinder of clutch A to the pump or to exhaust will now be described. Valve 170 has a slot 193 communicating with the bore 184. Sleeve 171 has a slot 194, communicating with chamber 186, which is closed by valve 170 when the latter is in its upper position, that is, when the solenoid 182 is de-energized, and which is in communication with slot 193 in the valve when the latter is in its lower position, that is, when the solenoid 182 is energized. The second group of ports appears at the upper portion of the valve and sleeve assembly, valve 170 having a circumferential groove 196 formed therein and the sleeve having a slot 197 at one side thereof in communication with chamber 186 and another slot 198 formed at the other side thereof in communication with exhaust line 190. These slots and groove are for connection or disconnection of the clutch, piston and cylinder to the exhaust port 190. When the valve is in its upper position, that is, when the solenoid 182 is de-energized, passageways 197 and 198 in the sleeve communicate with one another by means of the groove 196 thereby connecting the clutch A to the exhaust line 190, which connection appears in Fig. 16 as well as in Fig. 4, and enlarged views of the valve connections appear in Figs. 21 and 21a. When the valve 21 is in its lower position, as when the solenoid 182 is energized, the upper solid portion of the valve interrupts communication between the ports 197 and 198 in the sleeve, thereby cutting off the piston and cylinder from the exhaust port 190. This connection appears in Fig. 16a as well as in Figs. 18 and 22. Of course, with the valve in this position, as has been mentioned, the pump is connected to the piston and cylinder to cause it to engage the clutch A. Figs. 17 and 17a which are sections taken through the lower set of ports in the valve, the set that connects to the pump, show respectively the pump connected to the piston and cylinder, and the pump blocked therefrom by means of the valve 170 and the associated ports.

Preferred electrical connections for the solenoid that controls the valve 170 are shown diagrammatically in Fig. 15b. The battery 158 is connected to an on-off switch 200 which may be placed conveniently on the instrument board, and may be used to insure de-clutching in case repairs or the like are being made to the vehicle. A second switch 201 is in series with the battery and the solenoid 182 and is controlled by the accelerator 202.

Suitable override mechanism, well-known in the art, is provided so that when the accelerator is depressed to accelerate the vehicle, switch 201 is closed to energize the solenoid, actuate the valve 170, and cause clutch A to engage by hydraulic pressure. An emergency switch 203 may be provided convenient to the operator which shorts out the accelerator control and causes clutch A to engage fully and at will. Of course, both the electric brake solenoid coil and the valve solenoid coil may be connected to branch lines leading from the same battery, and in Fig. 23 a slight modification of this connection is shown, such modification embodying provision of an extra contact 204 at the controller closed by full depression of the pedal 164 and connected for controlling the electric brake solenoid 157. This extra contact 204 is connected by means of lead 206 directly to the valve solenoid 182, and when closed it shorts out all the other connections thereto. Thus, in case of emergency, if pedal 164 is depressed to fully apply the electric brake, the slider 163a also makes connection with the extra contact 204 and insures that the solenoid will be energized to engage the clutch A thereby establishing drive between the wheels and the rest of the mechanism through such clutch.

In operation, with the vehicle at rest and the engine idling, the accelerator switch 201 will be open, clutch A disengaged, and also clutch B will be disengaged. The latter occurs because the weights 67 will be retracted and communication from the pump will be directed to the interior of the impeller housing via the check valve 113. Communication between the pump and the piston and cylinder chamber of clutch B will be blocked by the ring valve 62 because the ring valve will close off port 114 in the hub 59. The impeller will soon be filled with fluid at a relatively low pressure of about 5 p. s. i., which pressure is the minimum or stand-by pressure, but is gradually increased up to a maximum of about 30 p. s. i. as vehicle speed increases. The only fluid necessarily supplied by the pump in normal operation is that which makes up any slight leakage that might occur from the impeller housing. Driving pressure of the hydraulic fluid between the coupling elements will tend to separate the vanes 46 from vanes 29, which separation is made possible by the connection of port 116 in hub 59 to the exhaust, as seen in Figs. 1 and 2. Since clutch A is disengaged, intermediate shaft S will be free to turn under action of the fluid coupling. When the accelerator is depressed, switch 201 is closed and the engine speed is increased under control of the accelerator. The impeller I of coupling C speeds up and due to the coupling between the axial surfaces, such as 47 of blades 46 and 31 of impeller blades 29, the runner and intermediate shaft S will begin to pick up speed. Also, as the accelerator closes switch 201, valve 170 moves to cause clutch A to engage and couple shafts S and $S_1$. However, during the slight delay in effecting this coupling, shaft S will be rotating through coupling C and there will be some slippage in clutch A during initial engagement. As a typical example, the vehicle may be traveling at a speed of approximately 5 M. P. H. when the weights 67, under the action of the centrifugal force due to rotation of shaft S, begin to overcome the tension of spring 69 and turn the ring valve 62. At about 10 M. P. H. the ring valve will begin to direct fluid to the piston and cylinder chamber and will have approached the position wherein such fluid may enter through port 114 and cause the runner R to advance toward the impeller. It is important to note that clutch B is a two-part clutch and is arranged to augment the initial pick up or coupling between the engine crankshaft and the intermediate shaft S. It has been mentioned that the fluid coupling is kept filled with fluid (when the engine is running) by the pump, at a pressure of 5 to 7 p. s. i. The driving reaction pressure developed between the vanes 29 and 46 initially urges the runner to the right in Fig. 1 which, in turn, urges the slidable hub 59 to the right, pressing clutch disc 61 against the turning clutch disc 57. Due to this action, initial acceleration of the runner, weight mechanism, and intermediate shaft S is augmented and made more positive than if such initial acceleration were derived from the fluid coupling alone.

As the runner is advanced toward the impeller by fluid pressure acting on piston 41, the radial surfaces of the blades on both members approach one another and the firmness of the fluid coupling is increased. As the intermediate shaft S, and hence the vehicle, continue to pick up speed, the weights 67 continue to move outwardly, and the ring valve 62 finally reaches its terminal position at a somewhat higher speed, such as approximately 15 M. P. H. Under these conditions, hub 39, which acts as the clutch ring, is urged by the powerful total force generated within the piston and cylinder chamber against the clutch ring 22 mounted on the crankshaft C so that a virtually positive drive is established.

The reaction of fluid within the piston and cylinder chamber continues to urge hub 59 that mounts the cylinder and weight assembly to the right (as seen in Fig. 19) so that clutch ring 61, mounted thereon, remains in pressure engagement with clutch ring 57 on the impeller housing, thereby increasing the additional coupling between the runner and the impeller which was initially established, as above described, before the engagement of hub 39 with ring 22 in clutch B.

As the speed of the driving wheels fluctuates the ring valve partially opens port 111 so that there is in effect a constant small flow of oil into the housing and out passage 120, so that the impeller is kept full and ready to operate at all times during operation of the vehicle.

If the vehicle slows down, as under a heavy load, port 114 is gradually closed by the ring valve and pressure in the cylinder drops due to leakage past the spline 37. This permits a gradually increasing slip between the clutch parts before they are fully disengaged and the pump connected to check valve 113. At this time, the runner R is forced back by the driving pressure within the impeller, the static or pump pressure therein being low, with the pump connected to the exhaust through check valve 113.

If the operator wishes to run the car in what is termed "free wheeling" the controls for the magnetic brake are left in the "off" position and the operator merely takes his foot off the accelerator. When this occurs, spring 183 operates the plunger mechanism of valve 170 so as to allow the valve spring 172 to lift the valve and, as has been explained, this connects the piston and cylinder assembly for the clutch A to the exhaust line. This, in turn, permits clutch spring 130 to disengage clutch A and shaft $S_1$, connected to the vehicle wheels, is free to turn and the vehicle will be operating in "free wheeling." It is noted that no ratchets or overrunning clutches are required for this operation. If the operator does not wish the car to go in "free wheeling" whenever he moves his foot from the accelerator, and does not wish for some reason or other to use the magnetic brake, or if the vehicle is not supplied with the magnetic brake, he may prevent the vehicle from going into "free wheeling" by keeping the dashboard switch 203 closed which, when the off-on switch is closed as it normally is in starting the vehicle, will keep the solenoid 182 energized and the clutch A will remain engaged. Whenever the clutch A is engaged, whether by the means just described or by energization of the magnetic brake E, direct drive from the wheels to the engine is established so long as the wheel speed does not drop below that sufficient to keep the weights 67 extended and fluid pressure behind the piston and cylinder assembly and clutch B. The parts are so designed that the weights do not retract until vehicle speed drops to approximately 10 M. P. H. whereupon the centrifugal force acting upon the weights reduces to such an extent that the ring valve will exhaust fluid from the piston and cylinder assembly for clutch B, and permit fluid within the impeller housing to retract the runner blades from the impeller blades and the drive will thereafter be from the wheels through the coupling C to the engine. Since the pump which supplies fluid under pressure to actuate the coupling C and associated parts is driven from the impeller casing, it will always be driven so long as the engine is turning, whether in driving or in engine braking, even if the vehicle is coasting. Thus, during the aforesaid engine braking action the pump is running and the fluid coupling operates in a normal manner except that it is driven from the wheels instead of from the engine. If additional braking force is required or if the mechanism that causes clutch A to engage does not function or is out of order, the emergency brake may be operated by suitable means such as the floor pedal 164 disposed within reach of the left foot of the operator. Regardless of whether or not clutch A is engaged, energization of the solenoid 157 of the electric brake causes magnetic lines of force between the poles of the brake to exert a dragging effect upon the flange 131 which is coupled to the output shaft $S_1$. The amount of this drag can be increased by further depressing pedal 164 and moving the contactor along the resistance, thereby shorting off the resistance progressively until maximum current flows through the coils of the electric clutch brake. Due to the construction of the brake a very powerful braking action may be thus obtained.

It is a feature of the apparatus that a point is reached adjacent the setting for maximum electric braking force wherein the clutch A is drawn into engagement by the electric brake, and insures that direct drive will be had between the vehicle drive shaft and the intermediate shaft S and to the other part of the transmission. Thus, so long as the vehicle is coasting at a speed above approximately 10 M. P. H. it is possible to apply both the direct braking of the engine to both couplings A and B as well as the magnetic braking thereof. Also, the application of magnetic braking action is entirely independent of the action of the clutches because the member 127, which is acted upon by the pole pieces of the magnetic brake, is splined at all times to the output shaft $S_1$ and hence directly connected to the rear wheels. It is possible, with the construction shown, to obtain a very powerful braking action so that operation of the vehicle is always safe, and auxiliary braking, in addition to the regular wheel brakes, is available at all times whether or not the clutches, couplings, pumps, etc. in the transmission proper are functioning. As a matter of fact, the magnetic braking may be made powerful enough with the battery current ordinarily available to permit manipulation of pedal 164 to take the place of manipulation of the conventional brake pedal during normal operation of the car, with the possible exception of quick stops from very high speeds. As noted, switch 200, which controls the solenoid 182 for the valve 170 and the brake E, is disposed so as to open the circuit of such solenoid regardless of the position of the accelerator switch. Thus, if a mechanic were working on the engine or any other part of the car, switch 200 could be left open and will so act as a safety measure to protect mechanics or the like who may be disposed about the vehicle.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. In a transmission having axially aligned driving, intermediate and output shafts with a fluid coupling for coupling said driving and intermediate shafts: a clutch including a pair of clutch elements keyed respectively to said intermediate and output shafts with one element slideable on its shaft, piston and cylinder means for moving the slideable element to engage said clutch, a hydraulic fluid reservoir, a pump driven by said driving shaft having an inlet drawing fluid from said reservoir and having an outlet, valve means including an exhaust port in communication with said reservoir for selectively connecting said piston and cylinder means to the outlet of said pump to engage said clutch and to said exhaust port, an electromagnetic brake including a brake armature secured to the sliding clutch element and a stationary electromagnet mutually disposed so that attraction of said armature to said electromagnet during electromagnetic braking action urges said slideable element in a clutch engaging direction, whereby engagement of the clutch may be effected by the attraction of said armature, and electrical control means for controlling said valve and for controlling the degree of electromagnetic braking action and thereby said attraction, said control means being adapted to selective independent actuation of said valve means and said electromagnetic brake.

2. In a transmission having axially aligned driving, intermediate and output shafts with a fluid coupling for coupling said driving and intermediate shafts: a clutch including a pair of clutch elements keyed respectively to said intermediate and output shafts with one of said elements slideable on its shaft, means normally biasing said slideable element from engaged position in said clutch, piston and cylinder means for moving the slideable element to engage said clutch, a hydraulic fluid reservoir, a pump driven by said driving shaft having an inlet drawing fluid from said reservoir and having an outlet, valve means including an exhaust port in communication with said reservoir for selectively connecting said piston and cylinder means to said pump and to said exhaust port, an electromagnetic brake including a brake armature on the sliding clutch element and a stationary electromagnet mutually disposed so that attraction of said armature to said electromagnet during electromagnetic braking action serves to move said slideable element in a clutch engaging direction whereby engagement of the clutch may be effected by the attraction of said armature, and electrical control means for controlling said valve and for controlling the degree of electromagnetic braking action and thereby said attraction, said control means being adapted to selective independent actuation of said valve means and said electromagnetic brake.

3. In a transmission having axially aligned driving, intermediate and output shafts with a fluid coupling for coupling said driving and intermediate shafts: a clutch including a pair of clutch elements keyed respectively to said intermediate and output shafts with one of said elements slideable on its shaft, means biasing the slideable element from engaged position in said clutch, piston and cylinder means for moving said slideable element to engage said clutch, a hydraulic fluid reservoir, a pump driven by said driving shaft having an inlet drawing fluid from said reservoir and having an outlet, solenoidally actuated valve means including an exhaust port in communication with said reservoir for selectively connecting said piston and cylinder means to said pump to engage said clutch and to said exhaust port, an electromagnetic brake including a brake armature fixed on the sliding clutch element and a stationary electromagnet mutually disposed so that attraction of said armature to said electromagnet during electromagnetic braking action serves to move said slideable element in a clutch engaging direction whereby engagement of the clutch may be effected by maximum attraction of said armature, and electrical control means for said valve means and for said brake permitting independent and simultaneous cooperative control selectively of said brake and said valve means.

4. In a transmission having axially aligned driving, intermediate and output shafts with a fluid coupling for coupling said driving and the intermediate shafts: a clutch including a pair of clutch elements keyed respectively to said intermediate and output shafts with one element slideable on the intermediate shaft, piston and cylinder means for moving said slideable element to engage said clutch, a hydraulic fluid reservoir, a pump driven by said driving shaft having an inlet drawing fluid from said reservoir and having an outlet, valve means including an exhaust port in communication with said reservoir for selectively connecting said piston and cylinder means to the outlet of said pump to engage said clutch and to said exhaust port, an electromagnetic brake including a brake armature fixed on the sliding clutch element and a stationary electromagnet mutually disposed so that attraction of said armature to said electromagnet during electromagnetic braking action urges said slideable element in a clutch engaging direction whereby engagement of the clutch may be effected by maximum attraction of said armature, and electrical means controlling the braking action and said attraction.

5. A device for transmitting torque from a driving to an output shaft including a clutch having a clutch element driven from said driving shaft and a second clutch element slideably keyed to said output shaft, piston and cylinder means for moving said slideable element to engage said clutch, a hydraulic fluid reservoir, a pump driven by said driving shaft having an inlet drawing fluid from said reservoir and having an outlet, valve means including an exhaust port in communication with said reservoir for selectively connecting said piston and cylinder means to the outlet of said pump to engage said clutch and to said exhaust port, an electromagnetic brake including a brake armature fixed on the sliding clutch element to rotate therewith and a stationary electromagnet mutually disposed so that attraction of said armature to said electromagnet during electromagnetic braking action urges said slideable element in a clutch engaging direction whereby engagement of the clutch may be effected by the attraction of said armature, and electrical control means for controlling said valve and for controlling the degree of electromagnetic braking action and thereby said attraction, said control means being adapted to selective independent actuation of said valve means and said electromagnetic brake.

6. A device for transmitting torque from a driving to an output shaft including a clutch having a clutch element driven from said driving shaft and a second clutch element slideably keyed to said output shaft, piston and cylinder means for moving said slideable element to engage said clutch, means normally biasing the slideable element from engaged position, a hydraulic fluid reservoir, a pump driven by said driving shaft having an inlet drawing fluid from said reservoir and having an outlet, valve means including an exhaust port in communication with said reservoir for selectively connecting said piston and cylinder means to the outlet of said pump to engage said clutch and to said exhaust port, an electromagnetic brake including a brake armature fixed on the sliding clutch element to rotate therewith and a stationary electromagnet mutually disposed so that attraction of said armature to said electromagnet during electromagnetic braking action urges said slideable element in a clutch engaging direction whereby engagement of the clutch may be effected by a maximum attraction of said armature, and, electrical control means for controlling said valve and for controlling the degree of electromagnetic braking action and thereby said attraction, said control means being adapted to selective simultaneous and independent actuation of said valve means and said electromagnetic brake.

References Cited in the file of this patent
UNITED STATES PATENTS

| | | |
|---|---|---|
| Re. 22,967 | Nutt et al. | Jan. 27, 1948 |
| 2,368,684 | Simpson | Feb. 6, 1945 |
| 2,442,840 | Carnagua | June 8, 1948 |
| 2,636,138 | Pew et al. | Apr. 21, 1953 |